US007555376B2

(12) United States Patent
Beronja

(10) Patent No.: US 7,555,376 B2
(45) Date of Patent: Jun. 30, 2009

(54) DYNAMIC INFORMATION METHOD AND SYSTEM

(75) Inventor: Gerald S. Beronja, Lake Villa, IL (US)

(73) Assignee: Snap-On Incorporated, Pleasant Prairie, WI (US)

( * ) Notice: Subject to any disclaimer, the term of this patent is extended or adjusted under 35 U.S.C. 154(b) by 857 days.

(21) Appl. No.: 11/010,320

(22) Filed: Dec. 14, 2004

(65) Prior Publication Data

US 2006/0123692 A1 Jun. 15, 2006

(51) Int. Cl.
*G01M 17/00* (2006.01)

(52) U.S. Cl. .............................. 701/33; 701/35; 701/29; 701/32

(58) Field of Classification Search ............. 701/29–34; 700/95–110, 11, 23, 17
See application file for complete search history.

(56) References Cited

U.S. PATENT DOCUMENTS

| | | | | |
|---|---|---|---|---|
| 6,138,056 | A | 10/2000 | Hardesty et al. | |
| 7,130,726 | B2 * | 10/2006 | Steinmeier et al. | 701/29 |
| 7,191,040 | B2 * | 3/2007 | Pajakowski et al. | 701/1 |
| 2002/0198639 | A1 | 12/2002 | Ellis et al. | |
| 2003/0060953 | A1 | 3/2003 | Chen | |

FOREIGN PATENT DOCUMENTS

| | | |
|---|---|---|
| DE | 100 60 747 | 1/2003 |
| WO | WO 03/105039 | 12/2003 |
| WO | WO 2004/070490 | 8/2004 |
| WO | WO 2004/074949 | 9/2004 |

OTHER PUBLICATIONS

"Manuals With Complete 3D Visualization—Faster, Better, More Accurate" Internet, Mar. 11, 2003 XP002285845.

"Maintenance Manual IETM Demo" Internet, XP002285846 Retrieved from the Internet: URL:http://www.lattice3d.com/3ddemo/MaintenanceManual/video/ MaintenanceManual12.html> 'retrieved on Jun. 23, 2004!

International Preliminary Report on Patentability issued in International Application No. PCT/US2005/036379, dated Feb. 13, 2007.

* cited by examiner

*Primary Examiner*—Richard M. Camby
(74) *Attorney, Agent, or Firm*—McDermott Will & Emery LLP

(57) ABSTRACT

A system and a machine-implemented method for receiving at least one data string from a remote device. A data string is selected from the at least one data string received, and technical/diagnostic information related to the selected data string is retrieved.

29 Claims, 10 Drawing Sheets

DYNAMIC INFORMATION METHOD AND SYSTEM

TECHNICAL FIELD

This disclosure relates to vehicular diagnostic information presentation systems and methodologies and, more particularly, to dynamic vehicular diagnostic information presentation systems and methodologies.

BACKGROUND

When diagnosing motor vehicle problems, scan tools (i.e., devices that interface with a vehicle's onboard computer system) are often used by technicians to retrieve one or more trouble codes concerning the vehicle being serviced, such that each trouble code received is indicative of a problem, symptom, or condition of the motor vehicle.

When addressing the individual problems associated with the retrieved trouble codes, technicians often rely upon printed technical manuals that show the various subsystems of the motor vehicle they are troubleshooting. These subsystems may include e.g., electrical, pneumatic, hydraulic and/or mechanical subsystems, and the technical manuals often include schematic diagrams of these various subsystems.

Unfortunately, these printed schematic diagrams are typically difficult to follow, as one or more complete subsystems are often included within a single schematic diagram. Additionally, while these printed schematic diagrams commonly contain considerable high-level information (e.g., wiring harness information and generalized component symbols), they are often lacking with respect to low-level information (e.g., component-specific information, photographs, and location information), as this additional low-level information typically makes the schematic diagrams appear overly crowded.

Alternatively or additionally, computer-based data systems may be used to retrieve computer-based trouble shooting information (i.e., electrical, pneumatic, hydraulic and/or mechanical schematic diagrams). However, these computer-based data systems tend to be stand-alone systems that are not integrated with e.g., the scan tool used to diagnose the motor vehicle, thus requiring the technician to maintain multiple systems and manually enter (into the computer-based data system) the data that was retrieved by the scan tool.

SUMMARY OF THE DISCLOSURE

In one implementation, a machine-implemented method includes receiving at least one data string from a remote device. A data string is selected from the at least one data string received, and technical/diagnostic information related to the selected data string is retrieved.

One or more of the following features may also be included. The selected data string may be associated with a make and model of vehicle. Retrieving technical/diagnostic information related to the selected data string may include retrieving technical/diagnostic information related to the make and model of vehicle. Selecting a data string may include clicking on or highlighting the selected data string with a pointing device. The remote device may be an electronic control unit within a motor vehicle. The technical/diagnostic information may be stored on a local or a remote data store.

A make and model of vehicle may be selected, and technical/diagnostic information related to the make and model of vehicle selected may be rendered on a display device. The technical/diagnostic information may include a schematic diagram associated with the make and model of vehicle selected. The schematic diagram may be selected from the group consisting of: an electrical schematic diagram; a vacuum schematic diagram; a pneumatic schematic diagram; and a hydraulic schematic diagram.

The schematic diagram rendered may include a plurality of discrete portions. A user may be allowed to graphically select one or more of the discrete portions of the schematic diagram, resulting in one or more selected discrete portions and one or more unselected discrete portions.

The technical/diagnostic information may include portion-specific technical/diagnostic information related to the one or more selected discrete portions. The portion-specific technical/diagnostic information may be rendered on the display device. The portion-specific technical/diagnostic information may be selected from the group consisting of: a part number for the one or more selected discrete portions; an image of the one or more selected discrete portions; a description of the normal operation of the one or more selected discrete portions; one or more condition-dependent variables concerning the one or more selected discrete portions; location information concerning the one or more selected discrete portions; one or more instructional videos concerning the one or more selected discrete portions; service bulletin information concerning the one or more selected discrete portions; and remedial information concerning the one or more selected discrete portions. The condition-dependent variables may be selected from the group consisting of a voltage, an amperage, a resistance, an impedance, and a waveform. The one or more selected discrete portions may be selected from the group consisting of: an electrical component; an electromechanical component; and a wiring harness.

The technical/diagnostic information may be selected from the group consisting of: a part number; an image; an operational description; one or more condition-dependent variables; location information; one or more instructional videos; service bulletin information; and remedial information.

In another implementation, a computer program product resides on a computer readable medium having a plurality of instructions stored on it. When executed by the processor, the instructions cause that processor to: receive at least one data string from a remote device; select a data string from the at least one data string received; and retrieve technical/diagnostic information related to the selected data string.

One or more of the following features may also be included. The computer program product may include instructions for: associating the selected data string with a make and model of vehicle, such that retrieving technical/diagnostic information related to the selected data string may include retrieving technical/diagnostic information related to the make and model of vehicle. The instructions for selecting a data string may include instructions for clicking on the selected data string with a pointing device. The instructions for selecting a data string may include instructions for highlighting the selected data string with a pointing device. The remote device may be an electronic control unit within a motor vehicle. The technical/diagnostic information may be stored on a local or remote data store.

The computer program product may include instructions for: selecting a make and model of vehicle, and rendering the technical/diagnostic information, on a display device, related to the make and model of vehicle selected. The technical/diagnostic information may include a schematic diagram associated with the make and model of vehicle selected. The schematic diagram may be selected from the group consisting of: an electrical schematic diagram; a vacuum schematic diagram; a pneumatic schematic diagram; and a hydraulic schematic diagram.

The schematic diagram rendered may include a plurality of discrete portions. The computer program product may include instructions for: allowing a user to graphically select one or more of the discrete portions of the schematic diagram, resulting in one or more selected discrete portions and one or more unselected discrete portions.

The technical/diagnostic information may include portion-specific technical/diagnostic information related to the one or more selected discrete portions. The computer program product may include instructions for: rendering the portion-specific technical/diagnostic information on the display device. The portion-specific technical/diagnostic information may be selected from the group consisting of: a part number for the one or more selected discrete portions; an image of the one or more selected discrete portions; a description of the normal operation of the one or more selected discrete portions; one or more condition-dependent variables concerning the one or more selected discrete portions; location information concerning the one or more selected discrete portions; one or more instructional videos concerning the one or more selected discrete portions; service bulletin information concerning the one or more selected discrete portions; and remedial information concerning the one or more selected discrete portions. The condition-dependent variables may be selected from the group consisting of a voltage, an amperage, a resistance, an impedance, and a waveform. The one or more selected discrete portions may be selected from the group consisting of: an electrical component; an electromechanical component; and a wiring harness.

The technical/diagnostic information may be selected from the group consisting of: a part number; an image; an operational description; one or more condition-dependent variables; location information; one or more instructional videos; service bulletin information; and remedial information.

The details of one or more implementations are set forth in the accompanying drawings and the description below. Other features and advantages will become apparent from the description, the drawings, and the claims.

DETAILED DESCRIPTION OF THE EMBODIMENTS

Figure 1:
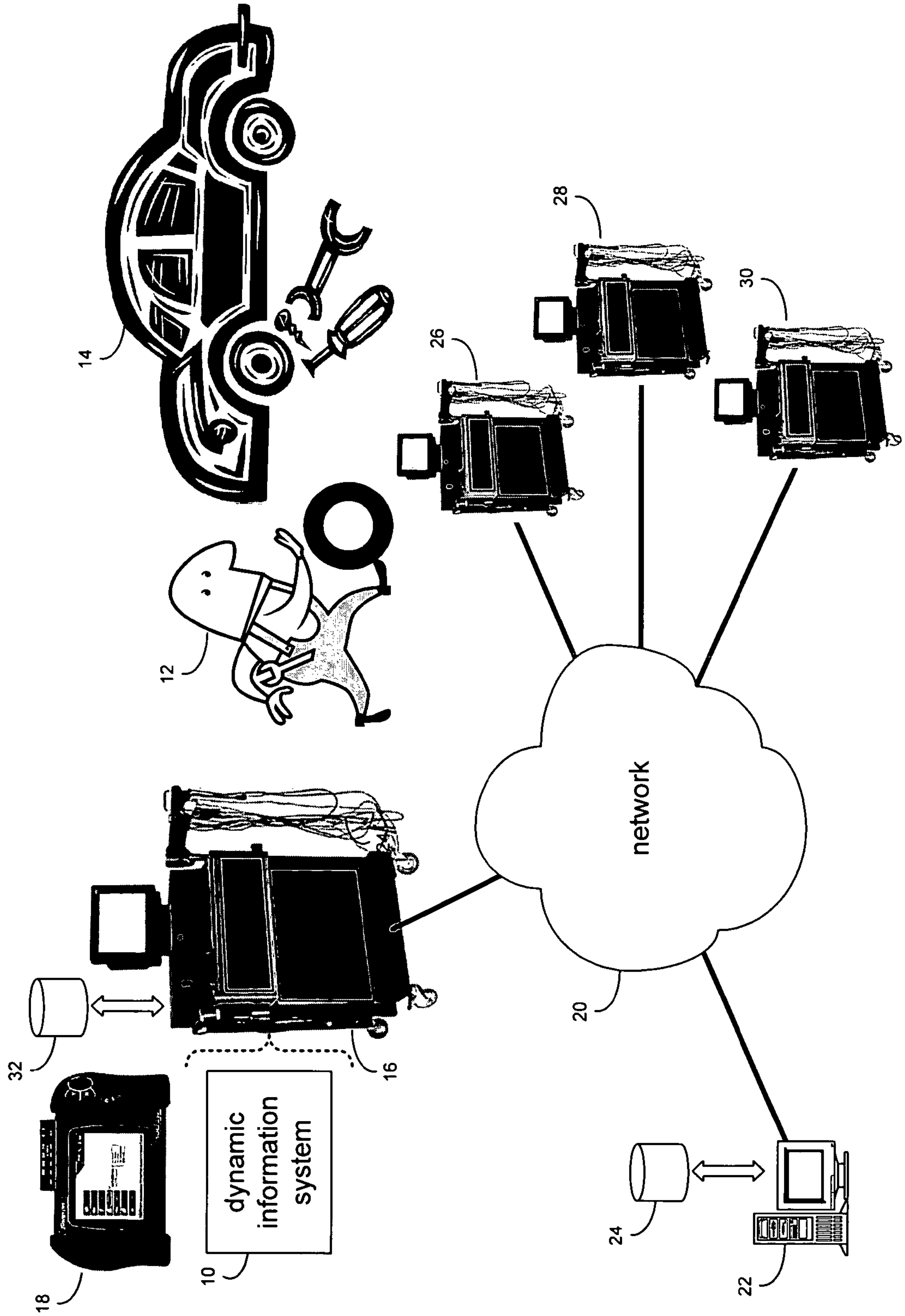
FIG. 1 is a diagrammatic view of a dynamic information system coupled to a distributed computing network.

Referring to FIG. 1, there is shown a dynamic information system 10 that provides a technician 12 with dynamic technical/diagnostic information concerning the various subsystems of the vehicle 14 that technician 12 is troubleshooting. As will be discussed below in greater detail, dynamic information system 10 monitors data strings (e.g., trouble codes) received from the vehicle 14 that technician 12 is working on, and tailors the technical/diagnostic information provided to technician 12 in accordance with these data strings.

Dynamic information system 10 typically resides on and is executed by a diagnostic system (e.g., a Sun Diagnostics SMP-4000 Modular Platform™ 16 or a Snap-On MODIS Modular Diagnostic Information System™ 18).

Diagnostic system 16 (or system 18) may be a stand-alone system (i.e., a system that locally stores all required technical/diagnostic information) or a network-based system (i.e., a system that remotely stores at least a portion of the required technical/diagnostic information). If a networked system, diagnostic system 16 (or system 18) may use network 20 to access remote server 22 that remotely stores at least a portion of the technical/diagnostic information (which will be discussed below in greater detail) on storage device 24 (e.g., a hard disk drive, a tape drive, an optical drive, a RAID array, a random access memory (RAM), or a read-only memory (ROM), for example).

Remote server 22 may be a web server running a network operating system, such as Microsoft Window 2000. Server™, Novell Netware™, or Redhat Linux™. Typically, remote server 22 also executes a web server application, such as Microsoft IIS™, Novell Webserver™, or Apache Webserver™, that allows for HTTP (i.e., HyperText Transfer Protocol) access to remote server 22 via network 20. Further, if diagnostic system 16 (or system 18) is networked, additional systems 26, 28, 30 may also be connected to remote server 22 (via network 20), thus allowing multiple system 16, 18, 26, 28, 30 to share the technical/diagnostic information stored on remote server 22.

The instruction sets and subroutines of dynamic information system 10, which are typically stored on a storage device 32 coupled to diagnostic system 16 (or system 18), are executed by one or more processors (not shown) and one or more memory architectures (not shown) incorporated into diagnostic system 16 (or system 18). Storage device 32 may be a hard disk drive, a tape drive, an optical drive, a RAID array, a random access memory (RAM), or a read-only memory (ROM), for example.

Figure 2:
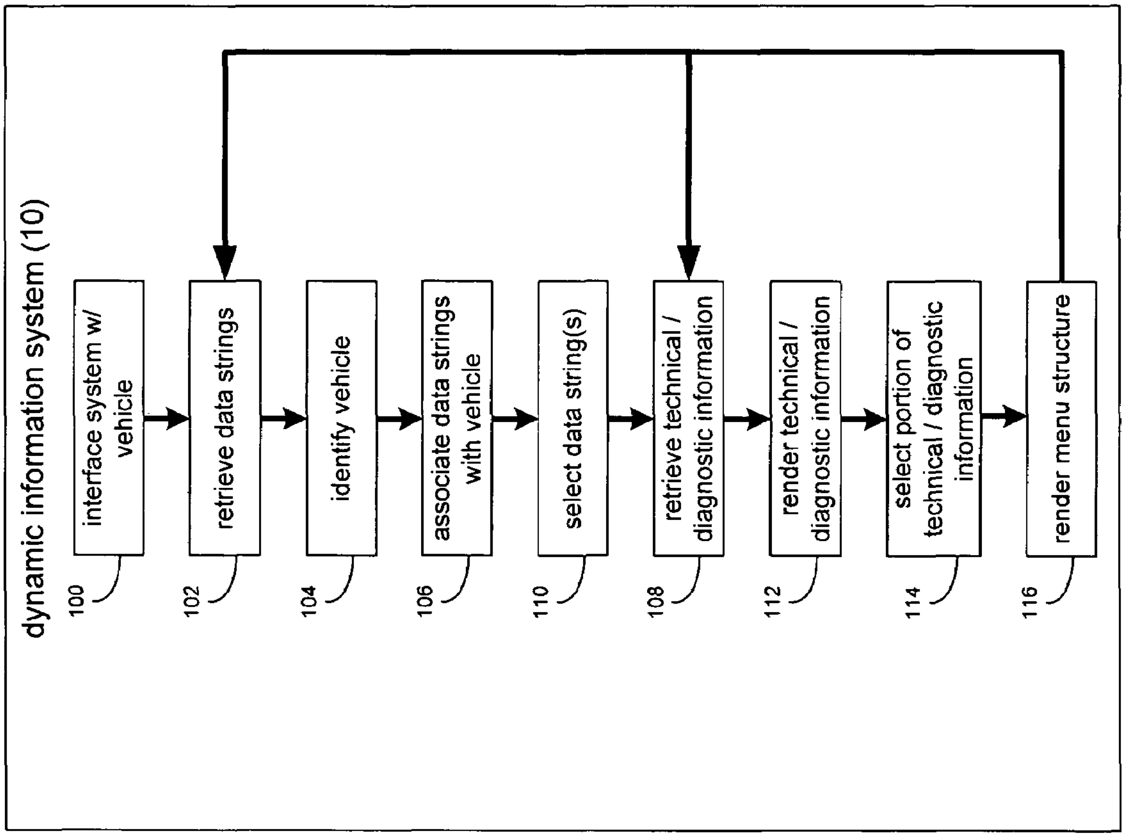
FIG. 2 is a flow chart of the dynamic information system of FIG. 1.

Referring also to FIG. 2, when using dynamic information system 10, technician 12 interfaces 100 system 16 (or system 18) with the control system of the vehicle being diagnosed (e.g., motor vehicle 14) so that data strings (i.e., trouble codes) may be received 102 from the vehicle.

Figure 3:
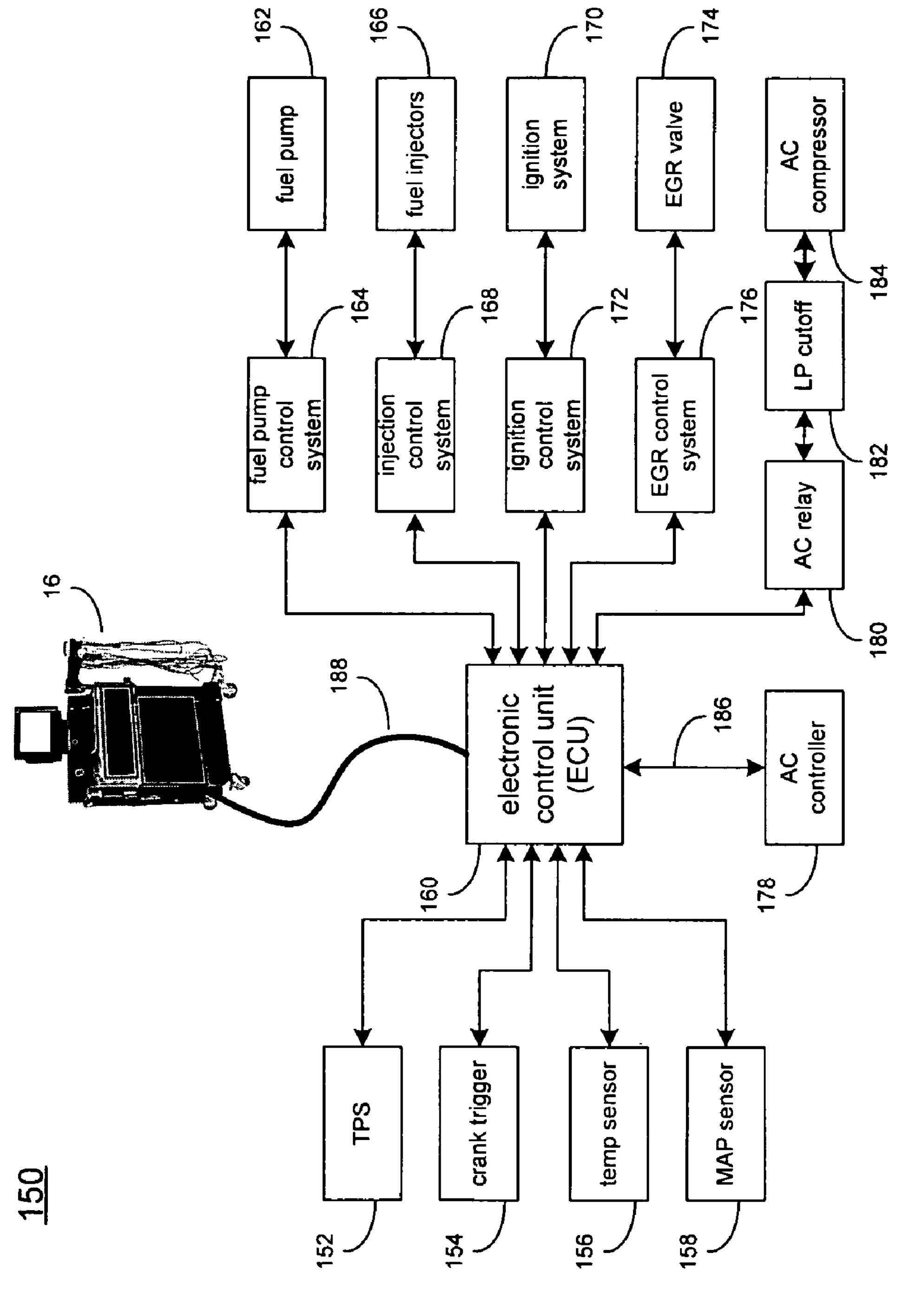
FIG. 3 is a schematic diagram of a motor vehicle interfaced with the dynamic information system of FIG. 1.

Referring also to FIG. 3, there is shown a schematic-representation 150 of the electrical system of motor vehicle 14, illustrating the interconnection of various components, such as: throttle position sensor (TPS) 152; crank trigger 154; engine temperature sensor 156; manifold absolute pressure (MAP) sensor 158; electronic control unit (ECU) 160; fuel pump 162; fuel pump control system 164; fuel injectors 166; injection control system 168; ignition system 170; ignition control system 172; emission gas recirculation (EGR) valve 174; EGR control system 176; air conditioning (AC) controller 178; AC relay 180; low pressure (LP) cutoff 182; and AC compressor 184, for example. Accordingly, the components shown in schematic diagram 150 may be electrical components (e.g., temp sensor 156), electrical-mechanical components (e.g., AC relay 180), or a portion of a wiring harness (e.g., wiring harness 186).

As discussed above, the control system (e.g., ECU 160) of motor vehicle 14 is interfaced with system 16 (or system 18) so that data stored on ECU 160 may be retrieved by system 16 (or system 18). Typically, system 16 (or system 18) is interfaced to ECU 160 using a multi-conductor cable 188 that is temporarily coupled to a service port (not shown) on the wiring harness of motor vehicle 14. However, other interface techniques (e.g., 802.11a, 802.11b, 802.11g, and infrared coupling, for example) are foreseeable and considered to be within the scope of this disclosure. The data stored within ECU 160 may include sensor readings (e.g., engine RPM, engine coolant temperature, engine oil pressure, engine oil temperature, and transmission fluid temperature, for example). Additionally, if events occurred during operation of the motor vehicle that are outside the range of normal operation, trouble codes are stored within ECU 160 so that they can be retrieved and analyzed at a later date. For example, engine overheating events, transmission overheating events, low engine oil pressure events, and out-of-range sensor events would typically all result in the generation of a trouble code that is stored within ECU 160 for later analysis. Examples of such trouble codes include: DTC P0705 (i.e., a faulty signal received from the gear selector position sensor); DTC 33 (i.e., a high voltage signal received from the mass air flow sensor); DTC P1250 (i.e., a malfunctioning solenoid circuit); DTC B2380 (i.e., a heater coolant temperature sensor circuit shorted to ground); DTC C1750 (i.e., an out-of-range signal received from accelerator position sensor(APS)); and DTC 71 (i.e., an EGR valve malfunction).

Since multiple makes and models of vehicles utilize common trouble codes, when using dynamic information system 10, technician 12 typically identifies 104 the vehicle 14 being analyzed, thus associating 106 the trouble code(s) received 102 with a specific vehicle, and allowing dynamic information system 10 to retrieve 108 technical/diagnostic information that is tailored not only to the trouble code received but also to the vehicle being analyzed.

For example, a Ford™ pickup truck and a Chevrolet™ passenger car may each utilize trouble code DTC C1750 to denote an out-of-range signal received from an APS. As the wiring harnesses, schematic diagrams, and the APS location/appearance/part number vary depending on which of these two vehicles the technician is working on, by identifying 102 the vehicle and associating 104 the trouble codes received with the identified vehicle, accurate and pertinent technical/diagnostic information (e.g., schematic diagrams, component part numbers; component images and illustrations; descriptions of normal component operation, component condition-dependent variables; component location information; instructional videos; service bulletin information; and/or remedial information) may be retrieved 108 and provided to the technician.

The identification of the vehicle may be made in various ways. For example, the make, model, and year of the vehicle may be selected (e.g., via drop down menus). Alternatively, the vehicle identification number (VIN) may be entered into dynamic information system 10, such that dynamic information system 10 accesses a look-up table (or a similar data structure; not shown), which correlates the VIN to a particular make, model, and year of vehicle.

Often, when servicing a vehicle, multiple trouble codes are received from ECU 160. For example, assume that when analyzing vehicle 14, trouble codes: DTC P0705; DTC 33; DTC P1250; DTC B2380; DTC C1750; and DTC 71 are received. As problems are typically analyzed and resolved one at a time, technician 12 typically selects 110 one or more of the trouble codes received, such that the pertinent technical/diagnostic information (relating to the selected trouble codes) can be retrieved 108. Accordingly, by allowing technician 12 to select 110 only the trouble code(s) in which they are interested (when a large number of trouble codes are retrieved), system 10 is prevented from having to retrieve an overwhelming amount of technical/diagnostic information.

Figure 4:
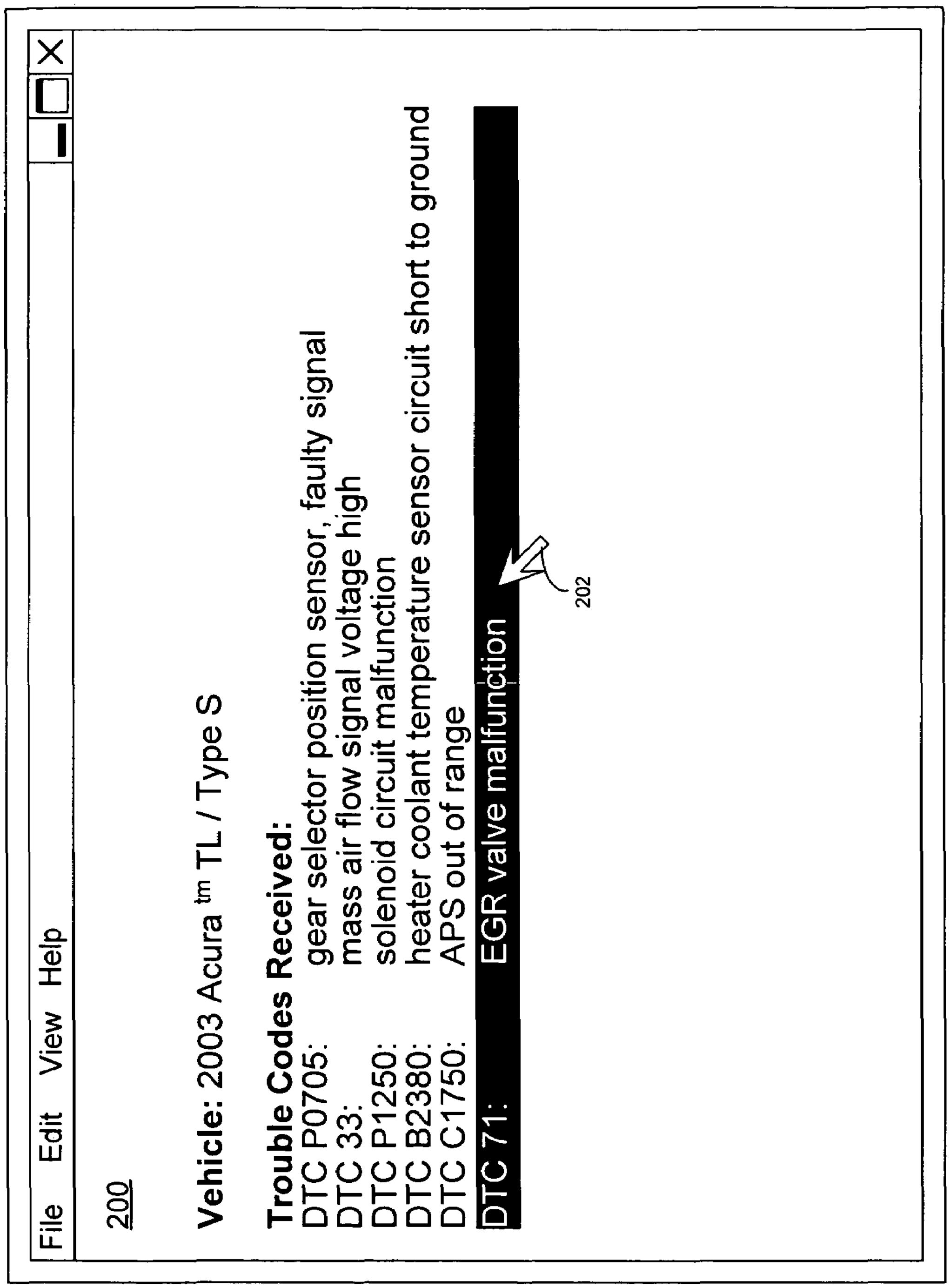
FIG. 4 is a diagrammatic view of a screen display rendered by the dynamic information system of FIG. 1.

Referring also to FIG. 4, a list 200 of the trouble codes received for the vehicle being analyzed (e.g., vehicle 14) is rendered on a display device (e.g., a CRT screen, an LCD screen, an LED display, or an LCD display, for example) of system 16 (or system 18). Once displayed, technician 12 may then select 110 the appropriate trouble code (e.g., code DTC71) by using pointer 202, which is controlled by a pointing device (e.g., a mouse, trackball, or touch screen device, not shown). Alternatively, using directional arrow keys (not shown) incorporated into system 16 (or system 18), technician 12 may highlight and select the appropriate code.

Once a code is selected, system 10 retrieves the appropriate technical/diagnostic information pertaining to the selected code as applied to the selected vehicle. In this particular example, the technical/diagnostic information will be retrieved for code DTC71 as applied to an 2003 Acura™ TL Type S.

Figure 5:
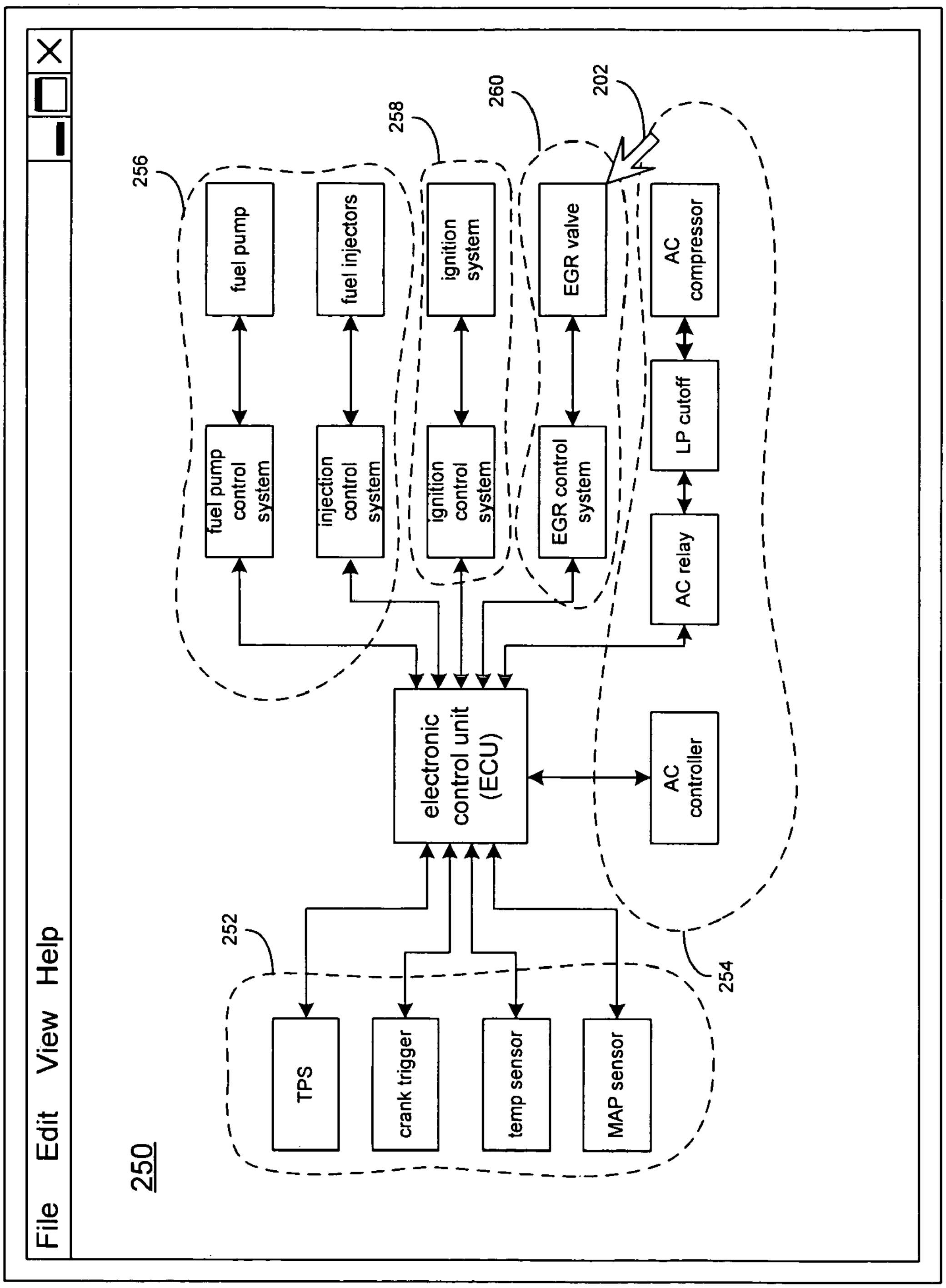
FIG. 5 is a diagrammatic view of a screen display rendered by the dynamic information system of FIG. 1.

Referring also to FIG. 5 and continuing with the above stated example, once a trouble code is selected, dynamic information system 10 retrieves 102 and renders 112 the appropriate technical/diagnostic information on the display device of diagnostic system 16 (or system 18). An example of such technical/diagnostic information is schematic diagram 250, which may be retrieved from local storage device 32 or from remote storage device 24 (if system 16/system 18 is networked). Schematic diagram 250 may be an electrical schematic diagram, a vacuum schematic diagram, a pneumatic schematic diagram, and/or a hydraulic schematic diagram, for example.

When retrieving the appropriate technical/diagnostic information, a look-up table (or database) is typically employed to determine which specific items (e.g., schematic diagrams, technical bulletins, videos, still images, and illustrations, for example) should be retrieved. For example, a table (or database record) may be defined for each year/make/model of vehicle, such that this table (or record) itemizes all of the potential trouble codes for that year/make/model of vehicle. Therefore, when a trouble code is selected 110, the appropriate look-up table (or record) is accessed, and the appropriate trouble code is located within the table (or record), such that the table (or record) specifies the appropriate e.g., schematic diagrams, technical bulletins, videos, still images, and illustrations, to be retrieved in response to the trouble code being selected.

Continuing with the above-stated example, schematic diagram 250 illustrates the interconnection of various components within vehicle 14, such as: such as: throttle position sensor (TPS) 152; crank trigger 154; engine temperature sensor 156; manifold absolute pressure (MAP) sensor 158; electronic control unit (ECU) 160; fuel pump 162; fuel pump control system 164; fuel injectors 166; injection control system 168; ignition system 170; ignition control system 172; emission gas recirculation (EGR) valve 174; EGR control system 176; air conditioning (AC) controller 178; AC relay 180; low pressure (LP) cutoff 182; and AC compressor 184, for example.

Depending on the complexity of the schematic diagram, the above-listed components may be grouped into the various portions, such as: a sensor circuit 252 (i.e., TPS 152, crank trigger 154, engine temperature sensor 156, and MAP sensor 158); an air conditioning circuit 254 (i.e., AC controller 178, AC relay 180, LP cutoff 182, and AC compressor 184); a fuel delivery circuit 256 (i.e., fuel pump 162, fuel pump control system 164, fuel injectors 166, and injection control system 168); an ignition circuit 258 (i.e., ignition system 170, and ignition control system 172); and an emission circuit 260 (i.e., EGR valve 174, and EGR control system 176). By dividing the schematic into portions, technician 12 is allowed to select 114 the particular systems/subsystems (within schematic diagram 250) that the technician is interested in. Further, while schematic diagram 250 (in this example) is divided into five logical portions, the number and size of the portions may be increased or decreased as needed when designing/programming the schematic diagrams.

As trouble code DTC71 (i.e., EGR valve malfunction) was selected by technician 12, technician 12 would typically select emission circuit 260 (which includes EGR valve 174 and EGR control system 176) using pointer 202, which is controlled by a pointing device (e.g., a mouse, trackball, or touch screen device, not shown). Once a particular portion of schematic diagram 250 is selected, a more detailed illustration (not shown) of the selected discrete portion may be rendered, or the selected discrete portion may be highlighted and/or the unselected discrete portion(s) “greyed-out” (i.e., shaded so that the unselected portions are contrasted from the selected portion).

Figure 6:
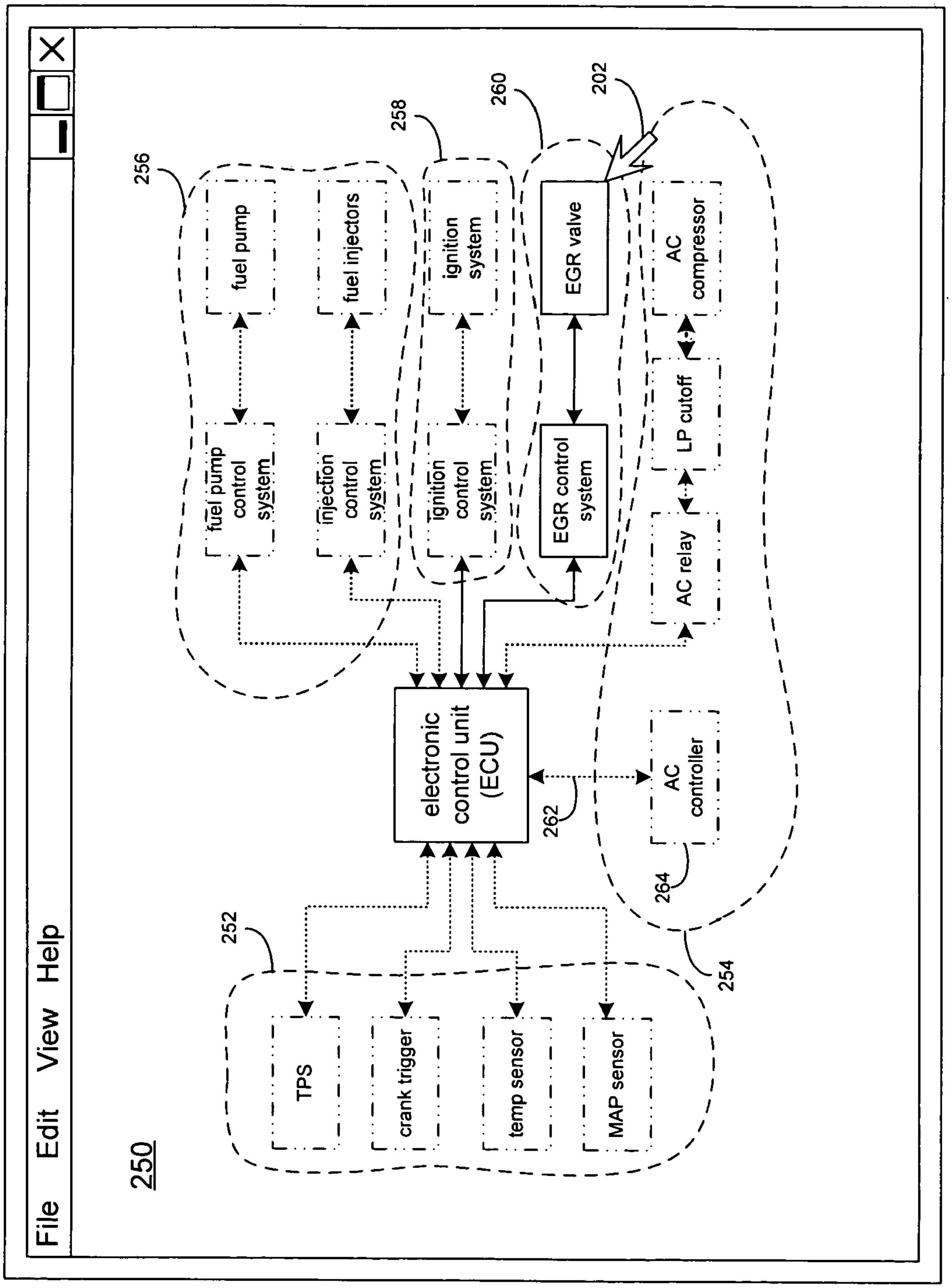
FIG. 6 is a diagrammatic view of a screen display rendered by the dynamic information system of FIG. 1.

Referring also to FIG. 6, once emission circuit 260 is selected, the unselected circuit portions are (in this example) “greyed-out” with respect to the selected circuit portion (e.g., emission circuit 260). In this example, circuits 252, 254, 256, 258 are shown as dashed lines (e.g., see circuit line 262 and sensor box 264).

Figure 7:
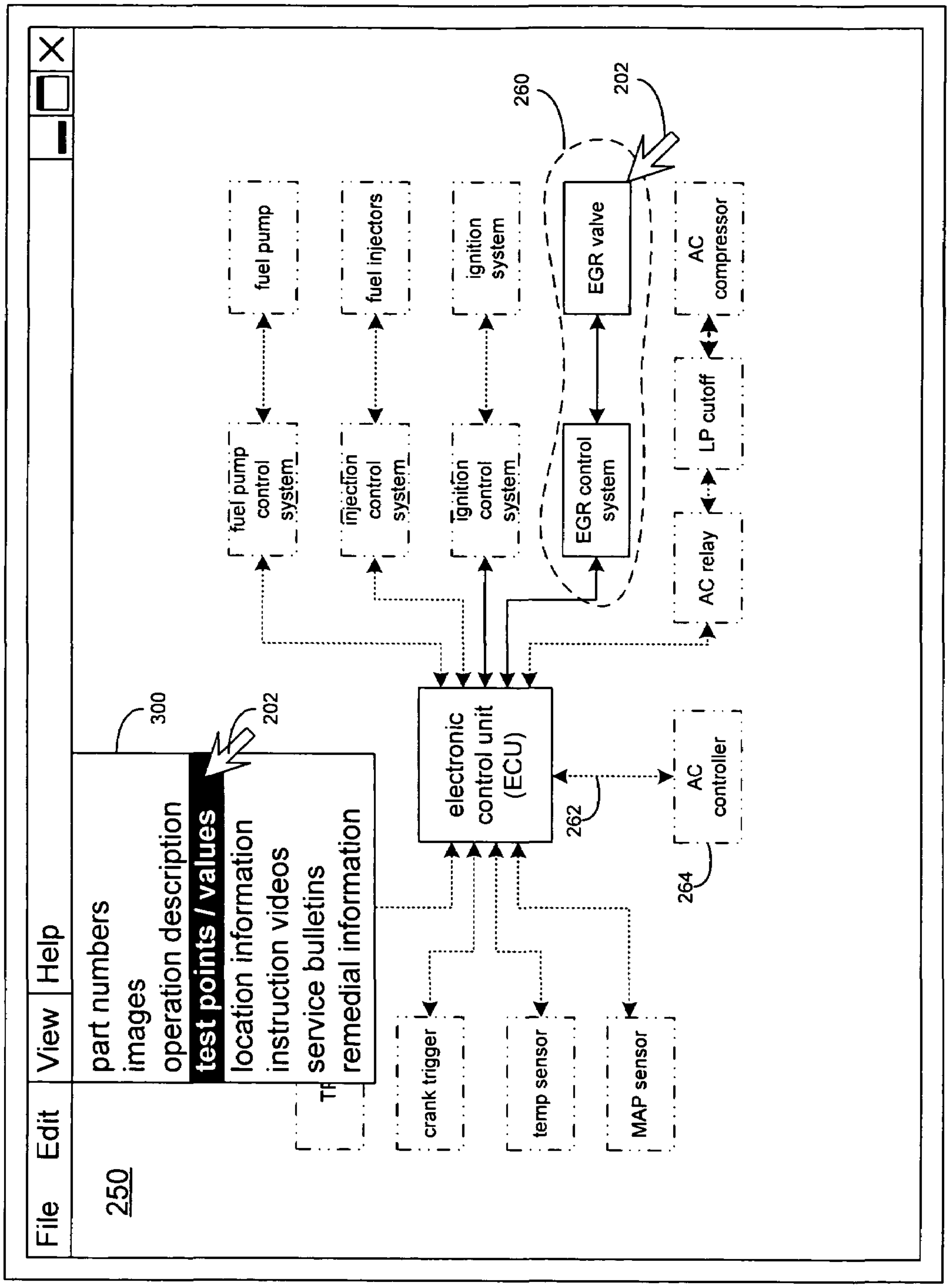
FIG. 7 is a diagrammatic view of a screen display rendered by the dynamic information system of FIG. 1.

Referring also to FIG. 7, technician 12 may retrieve additional information related to the selected trouble code. As stated above, trouble code DTC71 (i.e., EGR valve malfunction) was selected. After using schematic diagram 250 to review the interfacing of EGR valve 174, EGR control system 176, and ECU 160, technician 12 may wish to recieve additional information concerning circuit 260. For example, via drop-down menu 300 rendered 116 by dynamic information system 10, technician 12 may select the type of operation to be performed, such as retrieving 108 and rendering 112 e.g., part numbers of components within the selected discrete portion, images of components within the selected discrete portion, a description of the normal operation of components within the selected discrete portion, one or more condition-dependent variables (e.g., voltage, current, resistance, etc.), component location information, one or more instructional videos, service bulletin information concerning the selected discrete portion, and/or remedial information concerning the selected discrete portion).

Figure 8:
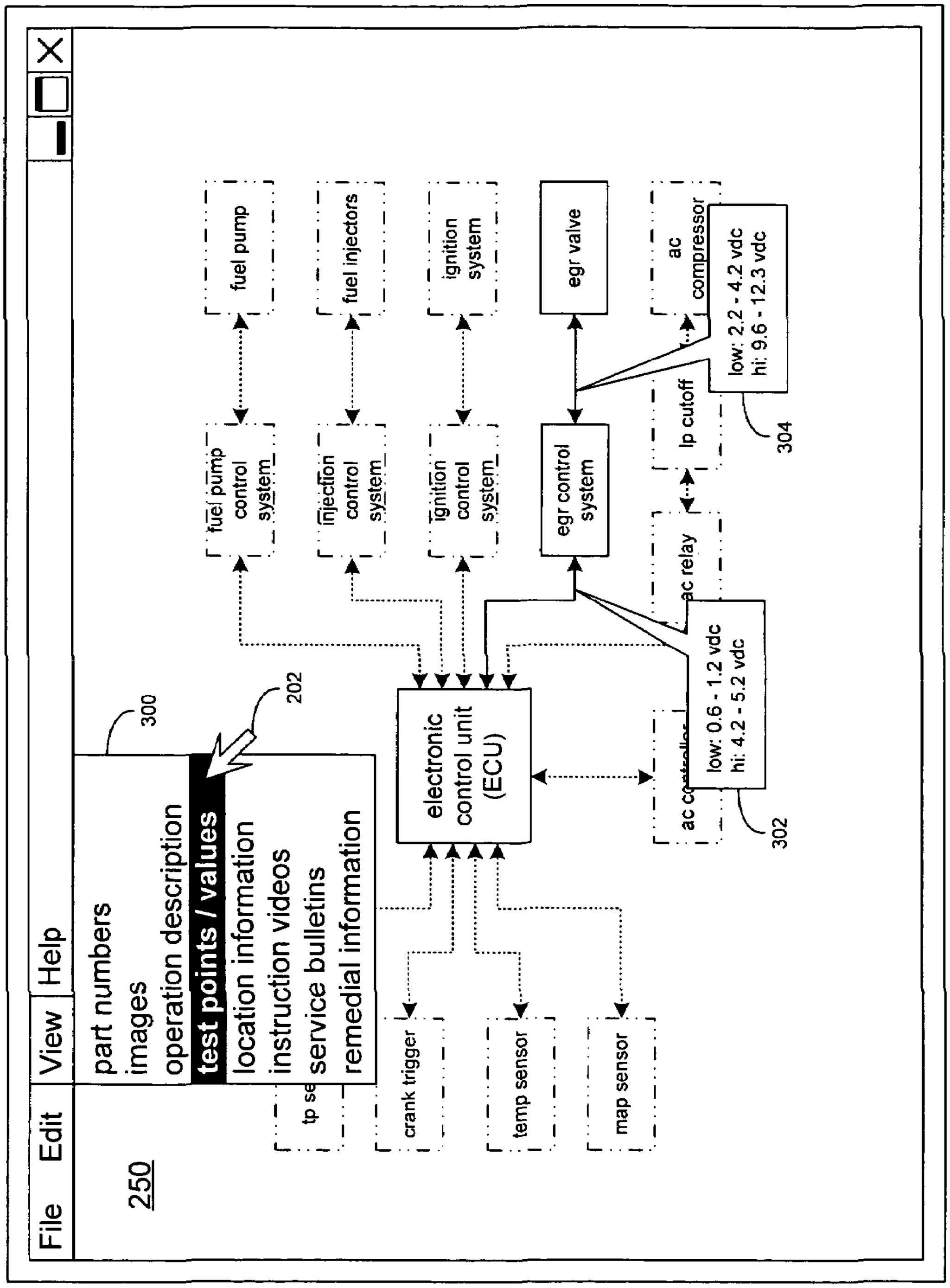
FIG. 8 is a diagrammatic view of a screen display rendered by the dynamic information system of FIG. 1.

Referring also to FIG. 8 and continuing with the above-stated example, assume that technician 12 selects “test points/values” from drop-down menu 300. Schematic diagram 250 is then populated with one or more callouts 302, 304 that locate the circuit test points and define the related values that should-be read at those test points. For example, callout 300 defines that for the wiring harness 306 between ECU 160 and EGR control system 176, a low signal value should be in the range of 0.60-1.20 vdc and a high signal value should be in the range of 4.20-5.20 vdc. Additionally, callouts 300, 302 may provide other types of information, such as line amperage, a resistance, an impedance, or a waveform (e.g., sine wave, or square wave, for example).

Figure 9:
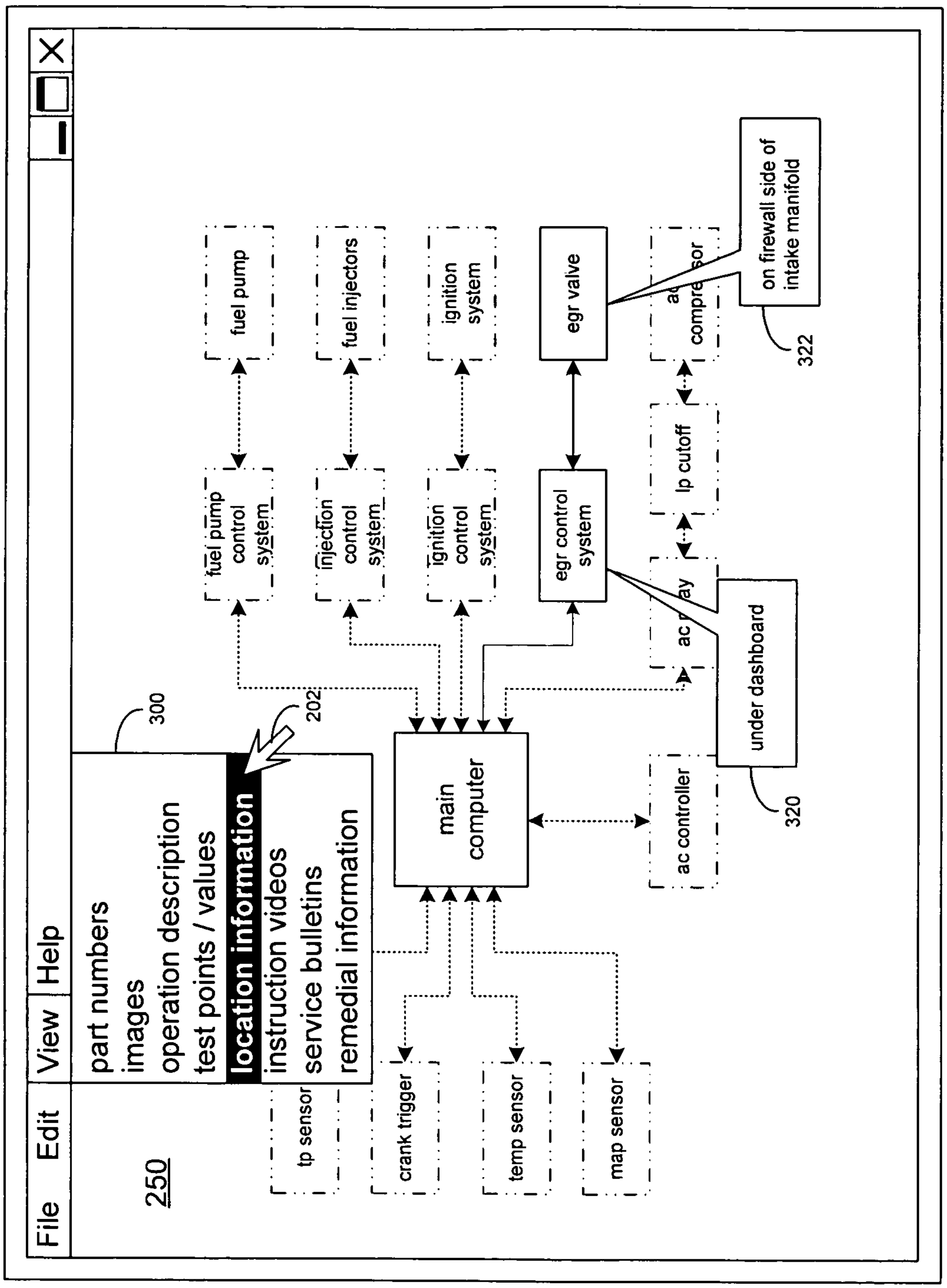
FIG. 9 is a diagrammatic view of a screen display rendered by the dynamic information system of FIG. 1.

Referring also to FIG. 9 and continuing with the above-stated example, assume that technician 12, upon inspecting the EGR control system 176 and finding it operational, suspects that the EGR valve 174 is malfunctioning, resulting in trouble code DTC71 (i.e., EGR valve malfunction). However, technician 12 does not know where EGR valve 174 is located. Technician 12 may select “location information” from drop-down menu 300. Schematic diagram 250 is then populated with one or more callouts 320, 322 that provide location information concerning the various components included in emission circuit 160. For example, callout 322 locates EGR valve 174 on the firewall side of the intake manifold.

Alternatively, the location information may be graphically presented to technician 12 in the form of an illustration of vehicle 14 (e.g., a top view illustration, a side view illustration, a front view illustration, a back view illustration or an isometric view illustration, not shown) in which the various components of, e.g., emission circuit 160 are superimposed onto the illustration in the appropriate location, thus allowing technician 12 to graphically locate a particular component within the vehicle.

Figure 10:
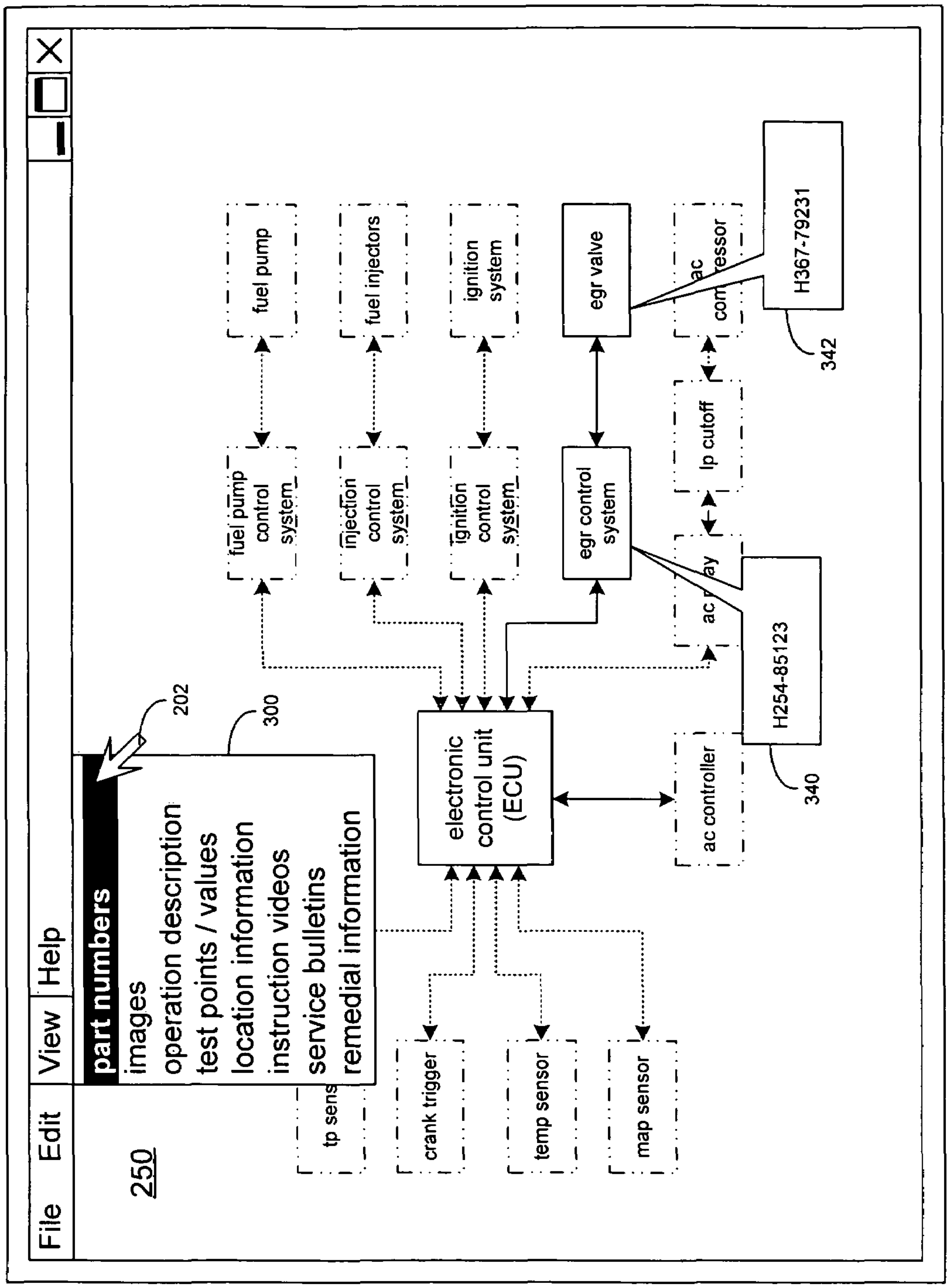
FIG. 10 is a diagrammatic view of a screen display rendered by the dynamic information system of FIG. 1.

Referring also to FIG. 10 and continuing with the above-stated example, assume that technician 12 determines (upon physical examination) that EGR valve 174 is malfunctioning. Technician 12 may select “part numbers” from drop-down menu 300. Schematic diagram 250 would then be populated with one or more callouts 340, 342 that define the part number (OEM or aftermarket) associated with each component within the circuit. For example, callout 342 informs technician 12 that the part number for EGR valve 174 is H367-79231.

In addition to the drop-down menu selections described above, technician 12 may select “images” from menu 300 and be provided with photographs and/or illustrations (not shown) of the component(s) in question.

By selecting “operation description” from menu 300, technician 12 is provided with a detailed description of the operation of the component in question. This may be a text-based description, an audio-based description, or a video-based description.

By selecting “instruction videos” from menu 300, technician 12 is provided with videos that provide enhanced technical information (e.g., the manner in which to replace a particular type of master cylinder).

Further, if technician 12 selects “service bulletins” from menu 300, technician 12 is provided with one or more service bulletins related to the circuit (or device/system) in question (e.g., all service bulletins related to the vehicle on which the technician is currently working).

Additionally, if technician 12 selects “remedial action” from menu 300, technician 12 is presented with a list of known problems, their respective causes, and their respective solutions. For example, when selecting “remedial action”, technician 12 may be informed that in heavy winter driving, salt-laden slush is often packed around the base of AC relay 180, resulting in the external relay contacts corroding and the relay prematurely failing. The technician may be informed to silicone seal the base of the relay to the relay socket to prevent corrosion of the terminals.

The embodiments described herein may include or be utilized with any appropriate voltage or current source, such as a battery, an alternator, a fuel cell, and the like, providing any appropriate current and/or voltage, such as about 12 Volts, about 42 Volts and the like.

The embodiments described herein may be used with any desired system or engine. Those systems or engines may comprise items utilizing fossil fuels, such as gasoline, natural gas, propane and the like, electricity, such as that generated by battery, magneto, fuel cell, solar cell and the like, wind and hybrids or combinations thereof. Those systems or engines may be incorporated into other systems, such as an automobile, a truck, a boat or ship, a motorcycle, a generator, an airplane and the like.

A number of implementations have been described. Nevertheless, it will be understood that various modifications may be made. Accordingly, other implementations are within the scope of the following claims.

What is claimed is:

1. A machine-implemented method comprising the steps of:

receiving at least one data string from an electronic control unit of a motor vehicle;

receiving a selection of a data string from the at least one data string received;

associating the selected data string with information of a make and model of the vehicle; and retrieving technical/diagnostic information related to the selected data string according to the selected data string and the make and model of the vehicle.

2. The method of claim 1, wherein selecting a data string includes the step of clicking on the selected data string with a pointing device.

3. The method of claim 1, wherein selecting a data string includes the step of highlighting the selected data string with a pointing device.

4. The method of claim 1, wherein the technical/diagnostic information is stored on a local data store.

5. The method of claim 1, wherein the technical/diagnostic information is stored on a remote data store.

6. The method of claim 1, further comprising the steps of:

receiving a selection of the make and model of the vehicle; and rendering the technical/diagnostic information, on a display device, related to the make and model of vehicle selected.

7. The method of claim 6, wherein the technical/diagnostic information includes a schematic diagram associated with the make and model of vehicle selected.

8. The method of claim 7 wherein the schematic diagram is selected from the group consisting of: an electrical schematic diagram; a vacuum schematic diagram; a pneumatic schematic diagram; and a hydraulic schematic diagram.

9. A machine-implemented method comprising the steps of:

receiving at least one data string from an electronic control unit of a vehicle;

receiving a selection of a data string from the at least one data string received;

associating the selected data string with information of a make and model of the vehicle;

retrieving technical/diagnostic information related to the selected data string according to the selected data string and the make and model of the vehicle, wherein the technical/diagnostic information includes a schematic diagram associated with the vehicle, and the schematic diagram includes a plurality of discrete portions; and allowing a user to graphically select one or more of the discrete portions of the schematic diagram, resulting in one or more selected discrete portions and one or more unselected discrete portions.

10. The method of claim 9, wherein the technical/diagnostic information includes portion-specific technical/diagnostic information related to the one or more selected discrete portions, the method further comprising the step of:

rendering the portion- specific technical/diagnostic information on the display device.

11. The method of claim 10, wherein the portion-specific technical/diagnostic information is selected from the group consisting of: a part number for the one or more selected discrete portions; an image of the one or more selected discrete portions; a description of the normal operation of the one or more selected discrete portions; one or more condition-dependent variables concerning the one or more selected discrete portions; location information concerning the one or more selected discrete portions; one or more instructional videos concerning the one or more selected discrete portions; service bulletin information concerning the one or more selected discrete portions; and remedial information concerning the one or more selected discrete portions.

12. The method of claim 11, wherein the condition-dependent variables are selected from the group consisting of a voltage, an amperage, a resistance, an impedance, and a waveform.

13. The method of claim 10, wherein the one or more selected discrete portions are selected from the group consisting of: an electrical component; an electromechanical component; and a wiring harness.

14. The method of claim 1, wherein the technical/diagnostic information is selected from the group consisting of: a part number; an image; an operational description; one or more condition-dependent variables; location information; one or more instructional videos; service bulletin information; and remedial information.

15. A computer program product residing on a computer readable medium having a plurality of instructions stored thereon which, when executed by the processor, cause that processor to:

receive at least one data string from an electronic control unit of a vehicle;

receive a selection of a data string from the at least one data string received;

associate the selected data string with a make and model of the vehicle; and retrieve technical/diagnostic information related to the selected data string according to the selected data string and the make and model of the vehicle.

16. The computer program product of claim 15, wherein the instructions for selecting a data string include instructions for clicking on the selected data string with a pointing device.

17. The computer program product of claim 15, wherein the instructions for selecting a data string include instructions for highlighting the selected data string with a pointing device.

18. The computer program product of claim 15, wherein the technical/diagnostic information is stored on a local data store.

19. The computer program product of claim 15, wherein the technical/diagnostic information is stored on a remote data store.

20. The computer program product of claim 15, further comprising instructions for:

receiving selection of the make and model of the vehicle; and rendering the technical/diagnostic information, on a display device, related to the make and model of vehicle selected.

21. The computer program product of claim 20, wherein the technical/diagnostic information includes a schematic diagram associated with the make and model of vehicle selected.

22. The computer program product of claim 21 wherein the schematic diagram is selected from the group consisting of: an electrical schematic diagram; a vacuum schematic diagram; a pneumatic schematic diagram; and a hydraulic schematic diagram.

23. A computer program product residing on a computer readable medium having a plurality of instructions stored thereon which, when executed by a processor, cause that processor to:

receive at least one data string from an electronic control unit of a vehicle;

receive a selection of a data string from the at least one data string;

associate the selected data string with a make and model of the vehicle; and retrieve technical/diagnostic information related to the selected data string according to the selected data string and the make and model of the vehicle, wherein the technical/diagnostic information includes a schematic diagram associated with the vehicle and includes a plurality of discrete portions, and allow a user to graphically select one or more of the discrete portions of the schematic diagram, resulting in one or more selected discrete portions and one or more unselected discrete portions.

24. The computer program product of claim 23, wherein the technical/diagnostic information includes portion-specific technical/diagnostic information related to the one or more selected discrete portions, the computer program product further comprising instructions for:

rendering the portion- specific technical/diagnostic information on the display device.

25. The computer program product of claim 24, wherein the portion-specific technical/diagnostic information is selected from the group consisting of: a part number for the one or more selected discrete portions; an image of the one or more selected discrete portions; a description of the normal operation of the one or more selected discrete portions; one or more condition-dependent variables concerning the one or more selected discrete portions; location information concerning the one or more selected discrete portions; one or more instructional videos concerning the one or more selected discrete portions; service bulletin information concerning the one or more selected discrete portions; and remedial information concerning the one or more selected discrete portions.

26. The computer program product of claim 25, wherein the condition-dependent variables are selected from the group consisting of a voltage, an amperage, a resistance, an impedance, and a waveform.

27. The computer program product of claim 24, wherein the one or more selected discrete portions are selected from the group consisting of: an electrical component; an electromechanical component; and a wiring harness.

28. The computer program product of claim 15, wherein the technical/diagnostic information is selected from the group consisting of: a part number; an image; an operational description; one or more condition-dependent variables; location information; one or more instructional videos; service bulletin information; and remedial information.

29. A vehicular diagnostic information retrieval system comprising:

a data receiving device for receiving at least one data string from an electronic control unit of a vehicle;

a selection device for allowing a user to select a data string from the at least one data string received; and a retrieval device for associating the selected data string with a make and model of the vehicle and retrieving technical/diagnostic information related to the selected data string according to the selected data string and the information of the make and model of the vehicle.

* * * * *